UNITED STATES PATENT OFFICE.

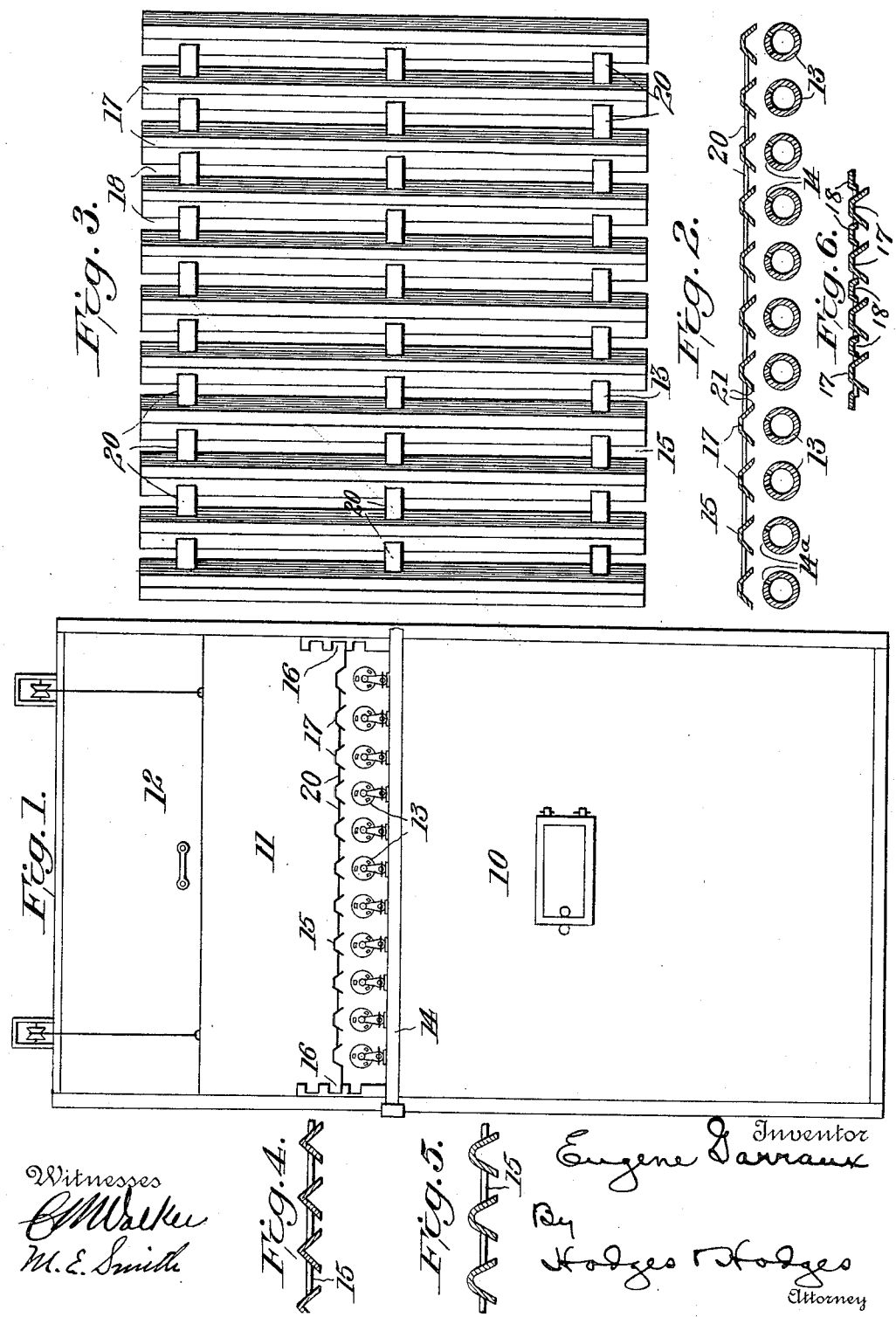

EUGENE GARRAUX, OF BALTIMORE, MARYLAND.

BROILER.

1,133,850.  Specification of Letters Patent.  Patented Mar. 30, 1915.

Application filed February 27, 1914. Serial No. 821,489.

*To all whom it may concern:*

Be it known that I, EUGENE GARRAUX, a citizen of the Republic of Switzerland, residing at Baltimore city, in the State of Maryland, have invented new and useful Improvements in Broilers, of which the following is a specification.

This invention relates to an improved broiler, and has reference more particularly to that type of broilers employed in connection with gas stoves, ranges, etc.

One of the objects of the invention is to provide a grid slidably supported above a gas flame, whereby the placing of meat and the like, upon the grid is facilitated.

A further object is to provide a grid so constructed that the heat from the flame is directly applied thereto, whereby the broiling action effects the retaining of the juices within the meat.

A further object is to provide a broiler so constructed that any grease or drippings from the meat being cooked will be caused to drain into a pan below the burner without striking the latter, whereby the burner is protected and kept clean.

A further object is to provide a broiler which may be uniformly heated.

The invention will be hereinafter fully set forth and particularly pointed out in the claims.

In the accompanying drawings: Figure 1 is a front elevation illustrating a gas stove with my improved broiler applied thereto. Fig. 2 is a transverse sectional view illustrating the broiler and the burners. Fig. 3 is a plan view of the broiler. Figs. 4, 5 and 6 are views of slight modifications.

Referring to the drawings, 10 designates a gas stove of any suitable or preferred construction, the form illustrated being provided with a broiler chamber 11 normally closed by a sliding hood 12. The gas burners 13 may be of any suitable or preferred type, receiving gas from a supply pipe 14. One of said burners may be a pilot burner. As shown the burners are of tubular form, each provided with spaced apart openings or orifices 14ª through which the gas escapes and at which points the gas is ignited.

My improved broiler comprises a grid 15 the edges of which slidably engage guides 16 secured to the sides of the broiler chamber 11. Said grid comprises a body provided with spaced apart members 17 formed with flattened surfaces 19 as illustrated in Fig. 2, or they may be of inverted V-shape or oval as illustrated in Figs. 4 and 5 respectively. Said members are connected together below their apexes by short bars 20. The members 17 are so arranged as to straddle or extend beyond the openings 14ª of the burners 13 so that any grease or drippings from the meat being cooked will pass down between the burners and without contacting with the latter. The arrangement of the grid is such that the members 17 are located one above each of the burners 13 so that these portions receive the full benefit of the gas flames and thoroughly effect the heating of all portions of the broiler.

From what has been said it will be understood that I have provided a broiler which may be supported above a gas flame so as to secure the full benefit of the heat therefrom, and yet by providing a sliding support for the broiler the same may be readily withdrawn to facilitate the placing of the meat or other article thereon. It will be further noted that the flame projects from the burners diagonally against the sides of the ridge portions of the grid, and the openings in the grid are so related that the grease and drippings will pass through without clogging the burners. If desired the pan ordinarily located below the burners may be filled with water to minimize the danger of the dripping grease catching fire. If desired the broiler may be provided with supplemental grid bars 18 placed between the bars 17, as illustrated in Fig. 6. These supplemental bars 18 also receive a large portion of the heat from the flames of the burners, whereby they are heated and assist in the broiling and marking of the meat. By means of my improved broiler the intense heat from the flame directly applied effects a saving of the juices in that the latter are retained within the meat.

Having thus explained the nature of my invention and described an operative manner of constructing and using the same, although without attempting to set forth all of the forms in which it may be made, or all of the forms of its use, what I claim is:—

1. An improved broiler comprising a unitary structure formed of a series of spaced apart parallel grid bars having depending diverging imperforate sides to shield a burner placed thereunder and short connecting bars secured to oppositely disposed grid bars below the tops thereof.

2. An improved broiler comprising a unitary structure formed of a series of spaced apart parallel grid bars having depending diverging imperforate sides to shield a burner placed thereunder and short connecting bars secured to oppositely disposed grid bars below the tops thereof, the ends of the grid bars extending beyond the planes of said connecting bars.

3. An improved broiler comprising a unitary structure formed of a series of spaced apart parallel grid bars having depending diverging imperforate sides to shield a burner placed thereunder and short connecting bars secured to oppositely disposed grid bars below the tops thereof, said grid bars having flat top surfaces.

4. An improved broiler comprising a unitary structure formed of a series of spaced apart parallel grid bars having depending diverging sides to shield a burner placed thereunder and short connecting bars secured to oppositely disposed grid bars below the tops thereof, and smaller supplemental grid bars arranged parallel with the first named grid bars and alternating therewith.

In testimony whereof I have hereunto set my hand in presence of two subscribing witnesses.

EUGENE GARRAUX.

Witnesses:
W. RUSSELL GREER,
R. McKEAN BARRY.

Copies of this patent may be obtained for five cents each, by addressing the "Commissioner of Patents, Washington, D. C."